United States Patent
Tonder et al.

(10) Patent No.: US 10,706,019 B2
(45) Date of Patent: Jul. 7, 2020

(54) DATABASE PROCESSING AFTER A LOCK CONDITION

(71) Applicant: SAP SE, Walldorf (DE)

(72) Inventors: Andreas Tonder, Weinheim (DE); Martin Heidel, Walldorf (DE); Edward-Robert Tyercha, Heidelberg (DE); Juchang Lee, Seoul (KR)

(73) Assignee: SAP SE, Walldorf (DE)

( * ) Notice: Subject to any disclaimer, the term of this patent is extended or adjusted under 35 U.S.C. 154(b) by 1091 days.

(21) Appl. No.: 14/861,438

(22) Filed: Sep. 22, 2015

(65) Prior Publication Data

US 2017/0083538 A1 Mar. 23, 2017

(51) Int. Cl.
*G06F 17/30* (2006.01)
*G06F 16/176* (2019.01)
*G06F 16/23* (2019.01)

(52) U.S. Cl.
CPC ...... *G06F 16/1774* (2019.01); *G06F 16/2308* (2019.01); *G06F 16/2365* (2019.01)

(58) Field of Classification Search
CPC ........... G06F 17/30171; G06F 16/1774; G06F 16/2308; G06F 16/2365
See application file for complete search history.

(56) References Cited

U.S. PATENT DOCUMENTS

| | | | | |
|---|---|---|---|---|
| 5,870,758 A * | 2/1999 | Bamford | ........... | G06F 17/30362 |
| 6,289,335 B1 * | 9/2001 | Downing | ............ | G06F 16/2393 |
| | | | | 707/769 |
| 7,430,740 B1 * | 9/2008 | Molloy | ................... | G06F 9/466 |
| | | | | 707/999.001 |
| 7,653,665 B1 * | 1/2010 | Stefani | ................ | G06F 16/2343 |
| | | | | 714/19 |
| 8,086,585 B1 * | 12/2011 | Brashers | ............ | G06F 17/30171 |
| | | | | 707/705 |
| 8,396,831 B2 * | 3/2013 | Larson | ............... | G06F 17/30356 |
| | | | | 707/638 |
| 9,417,974 B2 * | 8/2016 | Larson | ................ | G06F 11/1471 |
| 9,483,516 B2 * | 11/2016 | Lee | ....................... | G06F 16/2322 |
| 9,633,070 B2 * | 4/2017 | Grosman | .......... | G06F 17/30362 |
| 2007/0198584 A1 * | 8/2007 | Vienneau | ............... | G06Q 10/10 |
| 2008/0263549 A1 * | 10/2008 | Walker | .................... | G06F 9/466 |
| | | | | 718/100 |
| 2009/0037417 A1 * | 2/2009 | Shankar | .............. | G06F 16/2343 |
| 2009/0070330 A1 * | 3/2009 | Hwang | ............... | G06F 16/2477 |
| 2009/0240744 A1 * | 9/2009 | Thomson | ............ | G06F 11/2097 |

(Continued)

*Primary Examiner* — Jeff A Burke
(74) *Attorney, Agent, or Firm* — Sterne, Kessler, Goldstein & Fox P.L.L.C.

(57) ABSTRACT

Disclosed herein are system, method, and computer program product embodiments for performing database processing after a lock condition. An embodiment operates by receiving a release of a lock on data of a database. It is determined whether the data was modified by a processing of a first transaction associated with the first request. The lock is provided to a second transaction associated with a second request to access the data. If the first transaction did not modify the data, a second transaction associated with the second request is retried without refreshing a snapshot of the data. If the first transaction modified the data, the snapshot of the data is refreshed before the second transaction is retried.

20 Claims, 4 Drawing Sheets

(56) References Cited

U.S. PATENT DOCUMENTS

| | | | |
|---|---|---|---|
| 2010/0161555 A1* | 6/2010 | Nica | G06F 16/24561 707/624 |
| 2011/0137879 A1* | 6/2011 | Dubey | G06F 17/30171 707/704 |
| 2011/0153566 A1* | 6/2011 | Larson | G06F 9/466 707/638 |
| 2012/0011106 A1* | 1/2012 | Reid | G06F 9/466 707/695 |
| 2012/0109903 A1* | 5/2012 | Freedman | G06F 16/2365 707/690 |
| 2012/0136839 A1* | 5/2012 | Eberlein | G06F 16/2315 707/690 |
| 2013/0031069 A1* | 1/2013 | Dudgeon | G06F 17/30171 707/704 |
| 2013/0060742 A1* | 3/2013 | Chang | G06F 17/30359 707/704 |
| 2014/0040220 A1* | 2/2014 | Kimura | G06F 17/30171 707/704 |
| 2015/0088822 A1* | 3/2015 | Raja | G06F 16/2365 707/625 |
| 2015/0120687 A1* | 4/2015 | Bhattacharjee | G06F 16/2343 707/704 |
| 2015/0261805 A1* | 9/2015 | Lee | G06F 16/2322 707/703 |
| 2016/0147834 A1* | 5/2016 | Lee | G06F 16/24542 707/718 |
| 2016/0147906 A1* | 5/2016 | Schreter | G06F 16/9038 707/781 |
| 2016/0179876 A1* | 6/2016 | Jimenez Peris | G06F 16/2365 707/703 |
| 2016/0246864 A1* | 8/2016 | Boldt | G06F 9/466 |
| 2016/0306709 A1* | 10/2016 | Shaull | G06F 11/1458 |
| 2016/0308882 A1* | 10/2016 | Bortnikov | G06F 16/2322 |
| 2016/0350351 A1* | 12/2016 | Barber | G06F 16/2315 |

* cited by examiner

FIG. 1

| Outcome of Transaction 110A | Level 1 (Statement based) Isolation of Snapshot for Transaction 110B | | Level 2 (Transaction based) Isolation of Snapshot for Transaction 110C | |
|---|---|---|---|---|
| Flag Set ? | No | Yes | No | Yes |
| Transaction 110A Commits | 1) Retry (error result) 2) Refresh snapshot 3) Retry (success) 212A | 1) Refresh snapshot 2) Retry (success) 212B | 1) Retry (error result) 2) Abort 214A | 1) Abort 214B |
| Transaction 110A Rollback | 1) Retry (success) 222A | 1) Refresh snapshot 2) Retry (success) 222B | 1) Retry (success) 224A | 1) Abort 224B |

DATABASE PROCESSING AFTER A LOCK CONDITION

BACKGROUND

When multiple transactions are trying to modify the same data from a database, one of the transactions is issued a lock on the data, while the other transactions have to wait until the lock is released and the data is available. Generally, this locking approach preserves the consistency or integrity of the data and may produce an acceptable amount of latency in some database systems.

However, the result of the previous transaction that held the lock may cause unnecessary processing to be performed against the database when the lock is released to the next transaction, thus resulting in additional latency. This additional latency may reduce the usefulness and responsiveness of the database system. As such, any reduction in the number of unnecessary queries or other transactions executed against a database may save database resources, reduce latency, and improve the usefulness of the database.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for optimizing database processing after a lock condition.

Figure 1:
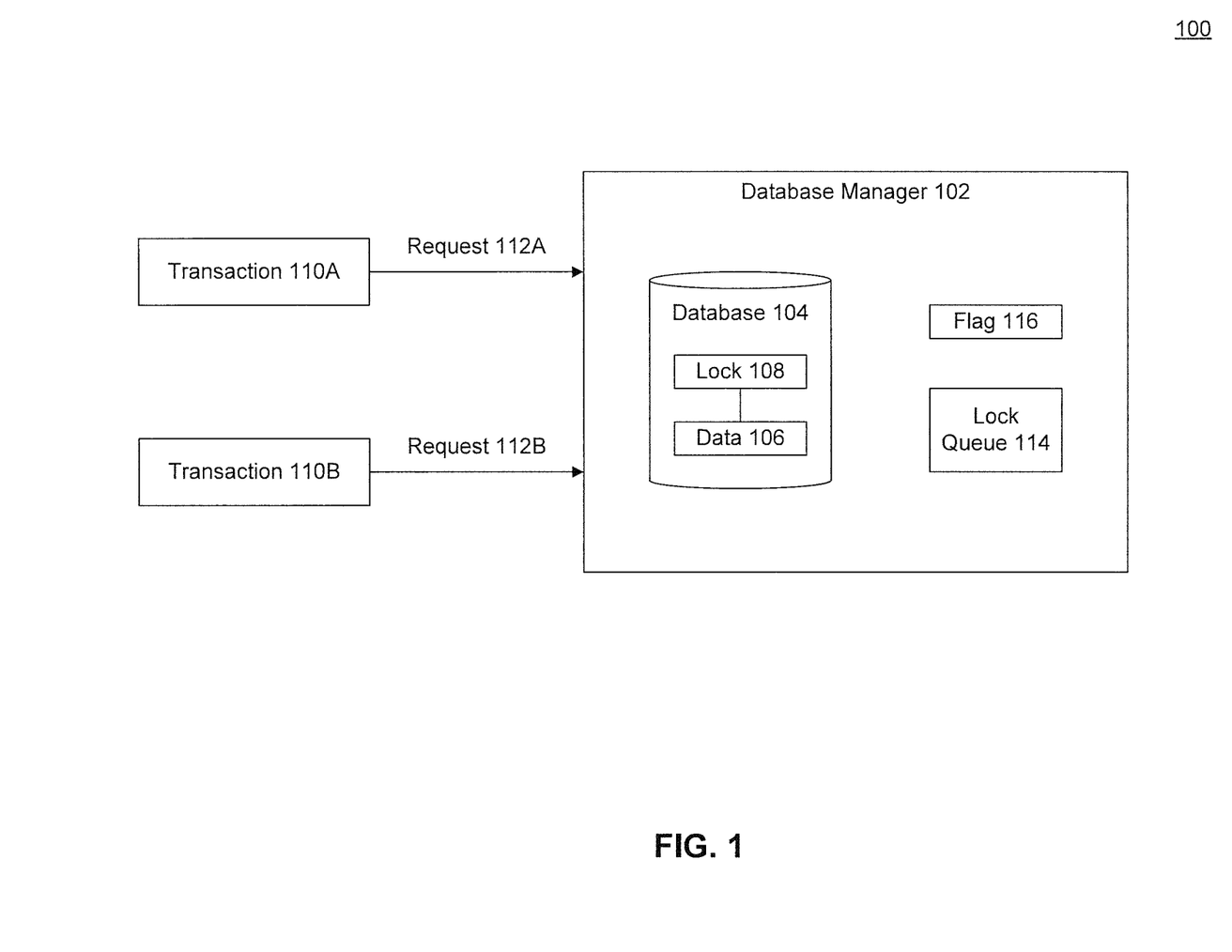
FIG. 1 is a block diagram of a database system configured to perform database processing after a lock condition, according to an example embodiment.

FIG. 1 is a block diagram of a database system configured to perform database processing after a lock condition, according to an example embodiment.

In an embodiment, two or more transactions 110A, 110B may transmit requests 112A, 112B (respectively) to access the data 106 of a database 104. The requests 112 may be for the same or overlapping data 106. A database manager 102 may receive and process the requests 112 to determine which request 112 receives access to the data 106. Any request(s) 112 not granted immediate access to data 106 may be placed in a lock queue 114.

Database manager 102 may determine which transaction 110 (as associated with the requests 112) is granted access to the requested data 106. Database manager 102 may, for example, provide priority access to different types of transactions 110 or to different users associated with the transactions 110, such that a particular transaction 110 or user gets priority over other transactions/users. In an embodiment, database manager 102 may grant priority or access to data 106 based on first come, first serve basis, or based on a priority status assigned to requestors and/or transaction type, to name just a few examples. Database manager 102 may process requests waiting 112 from lock queue 114 on a first in, first out (FIFO) manner, based on time of request or receipt of request 112.

Lock queue 114 may be a heap, array, or other storage mechanism used to track or store data requests 112. In an embodiment, database manager 102 may not allow two transactions 110 to simultaneously access or edit the same data 106. As such, based on a priority scheme such as but not limited to FIFO, a first request 110A may be issued a lock 108 that grants access to the requested data 106. The lock 108 may prevent other transactions 110B from simultaneously accessing or modifying the locked data.

When a transaction 110 is not granted immediate access to requested data 106, the transaction 110 may be placed in lock queue 114. In example embodiments described herein, lock queue 114 is described as being a FIFO queue. However in other embodiments, other queuing strategies may be used.

When transaction 110A has completed (or after the expiration of a maximum lock time), the issued or granted lock 108 may be released. Database manager 102 may then assign the released lock 108 to the next or highest priority transaction 110B from lock queue 114.

Some database systems use a static transaction processing approach. When a waiting transaction receives a lock, the transaction immediately tries to execute against the requested data. This execution or re-execution upon lock receipt is referred to as a retry.

In such a system, when a transaction is queued, the waiting transaction waits to modify data that was locked and is being accessed and potentially modified by another transaction. However, an issue is that the waiting transaction is trying to modify data that may be modified by the locking transaction. The waiting transaction has snapshot of the data as it existed prior to the current locking transaction accessing the data.

As such, if the transaction currently assigned the lock modifies the data and the waiting transaction attempts to execute upon receiving the lock, the subsequent transaction will fail to execute because of the data conflict. This is the case because the data would have changed between the time of snapshot and the time of lock receipt or data access of the waiting transaction. This execution failure wastes valuable database resources and unnecessarily increases database latency.

To address and solve this issue, in an embodiment, database manager 102 uses a dynamic approach to transaction processing. Rather than statically allowing, signaling, or causing a waiting transaction 110B that receives lock 108 to execute, a data check is performed prior to the waiting transaction 110B executing.

Database manager 102 may determine whether a previous locking transaction 110A (i.e., that previously held lock 108) modified data 106 that has been requested by a subsequent transaction 110B. For example, data 106 may have a timestamp of the most recent modification. If the timestamp of data 106 is subsequent to a timestamp of a snapshot of the database 104 or data 106 associated with transaction 110B, then a flag 116 may be set indicating the data 106 has changed or that the snapshot is old or out of date. Or, for example, database manager 102 may receive a signal or determine whether the locking transaction 110A committed any changes of data 106 to database 104, or whether the transaction 110A was rolled back. Or, for example, database manager 102 may compare the data value(s) of a snapshot of data 106 associated with transaction 110B against data 106 after lock 108 is released by locking transaction 110A, and determine if the data 106 has changed.

If the previous transaction 110A modified data 106, then flag 116 may be set indicating a data change or modification. The change may include adding, deleting, or otherwise modifying the data 106.

In an embodiment, database manager 102 may determine whether transaction 110A was committed to database 104 or was rolled back. A committed transaction may indicate that data 106 changed or potentially changed, and flag 116 may be set. A rolled back transaction may indicate that data 106 was not changed, in which case flag 116 may not be set.

In an embodiment, flag 116 may be a single bit flag or Boolean value, which if set indicates that data 106 was changed and if not set indicates that data 106 was not changed. In other embodiments, different indicators other than Boolean or single bit values may be used for flag data modifications or data consistency.

When lock 108 is released (by transaction 110A), flag 116 may be checked prior to the execution of a waiting transaction 110B. For example, flag 116 may be passed with lock 108 to transaction 110B. If flag 116 is not set (i.e., indicating data 106 is not different from the snapshot data, or that the previous transaction 110A was rolled back) then transaction 110B may execute. If, however, flag 116 is set (i.e., indicating data 106 has changed or that transaction 110A has committed) then rather than attempting to immediately execute, the snapshot of data associated with transaction 110B may be refreshed prior to execution or processing of transaction 110B. Alternatively, transaction 110B may be aborted if flag 116 is set.

If flag 116 is set, then the determination as to whether the snapshot of the waiting transaction 110B is refreshed before a retry, or the transaction 110B is aborted may depend on a snapshot isolation level of the transaction 110B. The snapshot isolation level may indicate how often or if a snapshot of data (e.g., data 106) is refreshed during the execution or processing of a transaction 110. In an embodiment, a transaction 110 may include one or more statements to be executed.

In an embodiment, a first isolation level (statement isolation level) may indicate that the snapshot of data is refreshed on or after the execution every statement of the transaction 110. The refreshed snapshot may include any data that may have been modified by transaction 110A or other concurrently executing transactions 110.

A second isolation level (transaction isolation level) may indicate that the data of snapshot is not refreshed on a per-statement basis, but instead the same is used from the beginning of a transaction until the completion of that transaction.

If, for example, flag 116 is set and the snapshot of transaction 110B that receives lock 108 is the first or at the statement isolation level, the snapshot may be updated before transaction 110B is retried, executed, or otherwise processed. However, if flag 116 is set and the snapshot of transaction 110B is at the second or transaction isolation level, transaction 110B may be aborted without retry or execution. These and other scenarios are discussed in greater detail with regard to FIG. 2.

In an embodiment, database manager 102 manages database 104. Database manager 102 may be a database management system (DBMS) that provides access to data 106. Access may include creating, reading, modifying, and other data access functions that may be requested by transactions 110.

Database 104 may be an organized collection of data 106, and be either a row-oriented or column-oriented database. Data 106 may be stored as records in one or more tables, columns, and rows. Lock 108 may be issued on per-record, per-column, per-row, per-table, or any other portion of data basis.

In an embodiment, database 104 may be stored across one or more database servers. Then for example, a transaction 110 when executed or retried may require access to multiple database servers and may consume even greater resources than if database 104 was stored on a single server. As such, unnecessary retries may cause even greater latency or otherwise consume greater resources.

Figure 2:
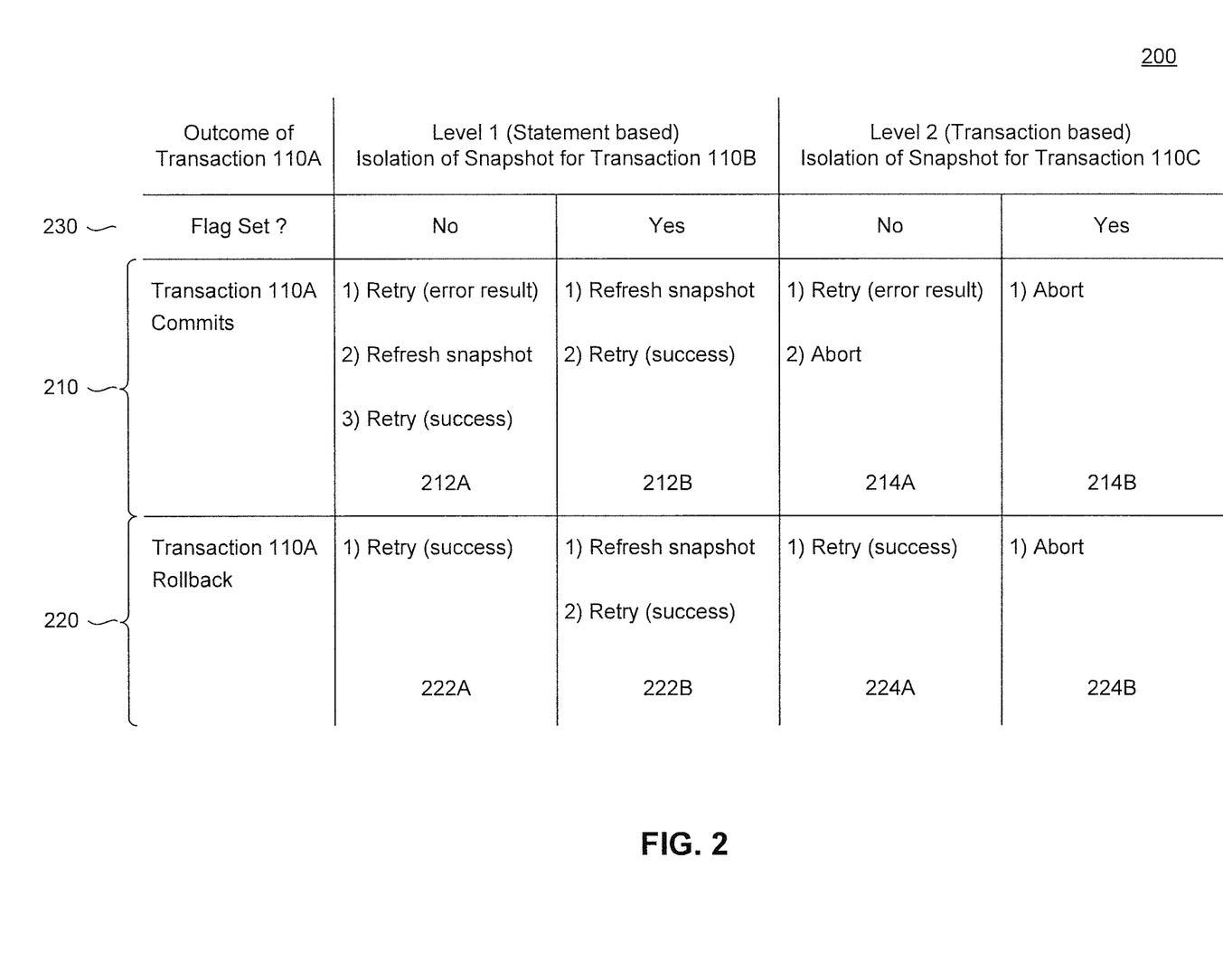
FIG. 2 is a chart showing how database processing is performed after a lock condition, according to an example embodiment.

FIG. 2 is a chart showing how database processing is performed after a lock condition, according to an example embodiment. The various exemplary embodiments and scenarios of FIG. 2 are described with reference to the processing of the system 100 of FIG. 1.

The first column of FIG. 2 indicates the outcome of a locking transaction 110A that previously held lock 108. Row 210 indicates what happens in various scenarios if transaction 110A commits or changes data 106. Row 220 indicates what happens in various scenarios if transaction 110A does not commit changes to data 106 or is otherwise rolled back.

The second column of FIG. 2 indicates what happens in a level 1 or statement-based snapshot isolation, where a snapshot of a waiting transaction 110B is updated on a statement-level basis. The third column, by contrast, indicates what happens in a level 2 snapshot isolation, where the snapshot of data for the waiting transaction 110B is only updated on a per-transaction level basis.

The second and third columns each have sub-columns that correspond to row 230. Row 230 indicates different scenarios for each isolation level as to what happens if flag 116 is set or not set.

Boxes 212A and 212B illustrate the differences between not setting flag 116 and setting flag 116 with regard to processing a waiting transaction (110B) in level 1 isolation. As shown in box 212A, not using or setting flag 116 results in the extra step of a retry that fails or results in an error being processed. In an embodiment, the retry may fail because of the variances in the snapshot data and the data 106 of the database 104 which was updated by transaction 110A. In an embodiment, this failure may be the result of a serialization error, and represents extra processing that could consume database resources and increase latency. As such, in an embodiment, database manager 102 sets flag 116 when transaction 110A commits, such that the steps of box 212B are executed within system 100, both saving database resources and reducing database latency.

Similarly, with regard to boxes 214A and 214B, an additional step of retry is performed in box 214A if flag is not set. As such, database manager 102 sets flag 116 such that the steps of box 214B are executed within system 100, and system 100 does not perform the extra retry step which would result in an error. As noted above, database manager 102 sets flag 116 when transaction 110A commits or changes data 106 of database 104 and lock 108 is released.

However, if transaction 110A does not commit, then flag 116 is not set. The efficiency gained by not setting flag 116 is shown in row 220. Database manager 102 does not set flag 116 if transaction 110A is rolled back, which results in the processing shown in boxes 222A and 224A. Setting flag 116 when transaction 110A does not commit or is rolled back would result in performing an extra step as shown in box 222B, or an unnecessary abort transaction as shown in box 224B.

Figure 3:
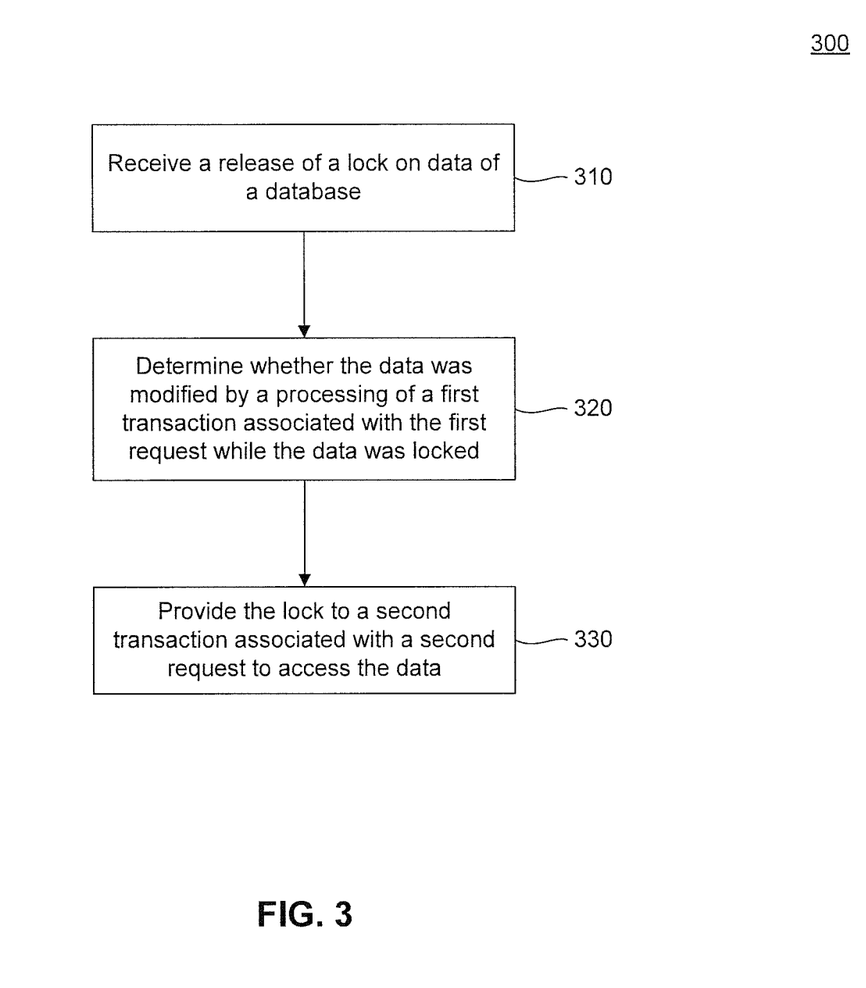
FIG. 3 is a flowchart illustrating a process for performing database processing after a lock condition, according to an example embodiment.

FIG. 3 is a flowchart for a method 300 for performing database processing after a lock condition, according to an embodiment. Method 300 can be performed by processing logic that can comprise hardware (e.g., circuitry, dedicated logic, programmable logic, microcode, etc.), software (e.g., instructions running on a processing device), or a combination thereof.

At step 310, a release of a lock on data of a database is received. For example, database manager 102 may provide lock 108 responsive to a request 112A for transaction 110A to access data 106. In step 310, database manager 102 may subsequently release lock 108, or otherwise receive a notification that lock 108 was released by transaction 110A, when transaction 110A has completed or timed-out.

At step 320, it is determined whether the transaction that released the lock in step 310 modified data while the lock was held. For example, database manager 102 may determine whether transaction 110A committed (or changed data 106) or was rolled back (or otherwise did not modify data 106). The data modification may occur while lock 108 was being held by transaction 110A. Upon completion of transaction 110A, prior to or after lock 108 is released, data manager 102 may determine if data 106 was modified. If data 106 was modified or if transaction 110A committed, then database manager 102 may set flag 116.

At step 330, the lock is provided to a second transaction associated with a second request to access the same or overlapping data of the immediately previous transaction. For example, database manager 102 may provide lock 108 to the next or waiting transaction 110B from lock queue 114. In an embodiment, database manager 102 may also pass flag 116 or otherwise make the value of flag 116 accessible to transaction 110B. Transaction 110B, or another system, may then check the value of flag 116 prior to the processing of transaction 110B. In an embodiment, if flag 116 is not set, then transaction 110B may execute in accordance with box 222A or 224A of FIG. 2. However, if flag 116 is set, then transaction 110B may execute in accordance with box 212B or 214B of FIG. 2.

Figure 4:
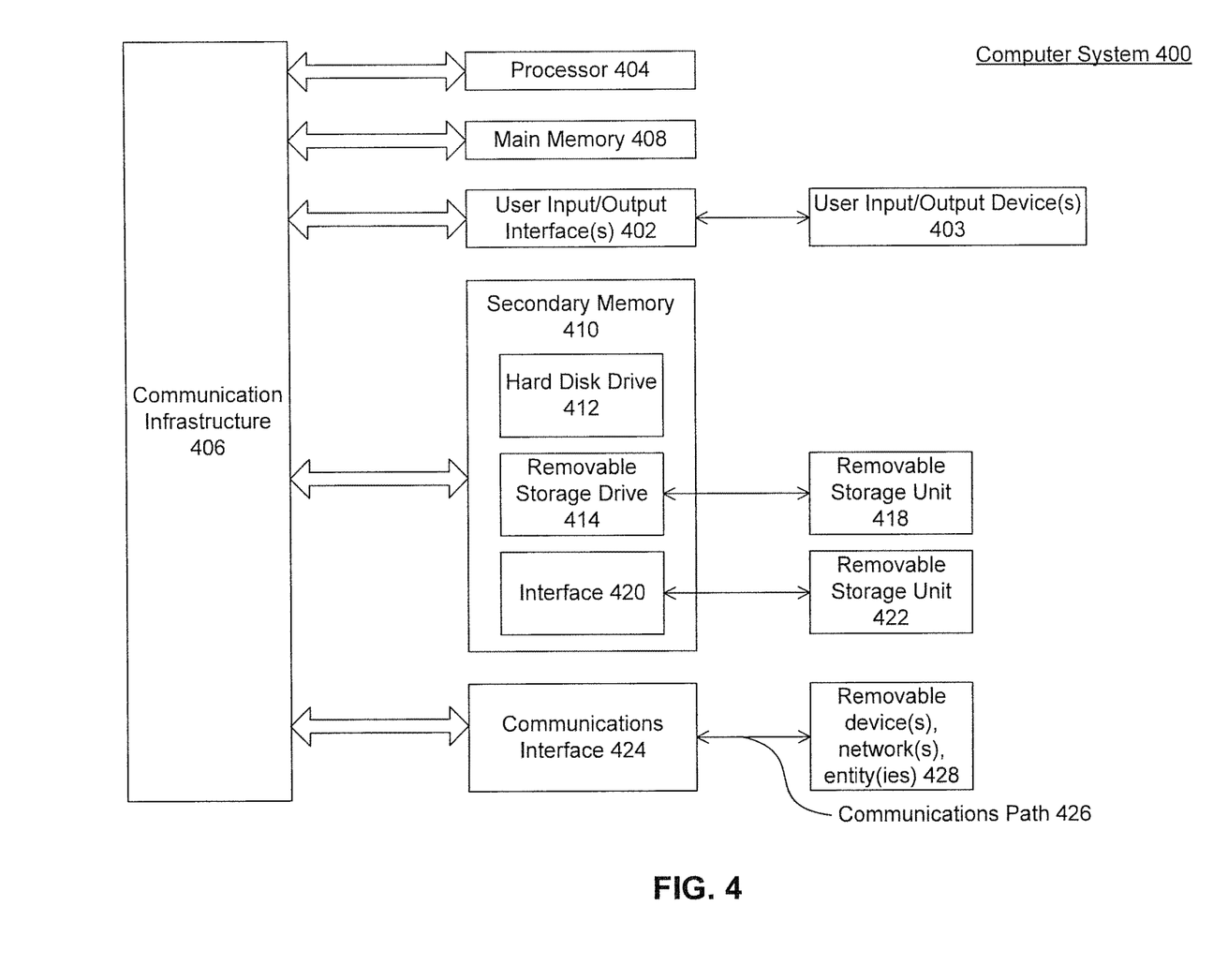
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method, comprising:
receiving a release of a lock on data of a database, wherein the lock on the data was provided to a first transaction responsive to a first request to access the data, wherein one or more queued transactions are waiting in a lock queue to access the data;
associating, prior to the lock, a snapshot of the data with a second transaction;
determining whether the data was modified by processing of the first transaction associated with the first request based on whether a flag was set prior to the receiving the release of the lock;
providing the lock to access the data to the second transaction from the lock queue; determining that the flag was set prior to receiving the release of the lock; and
refreshing the snapshot of the data associated with the second transaction prior to an execution of the second transaction and based on a snapshot isolation level;
wherein at least one of the receiving, determining, and providing are performed by one or more computers.

2. The method of claim 1, further comprising:
receiving the first request to access the data;
providing the lock to the first transaction responsive to receiving the first request; and
receiving the second request to access the data before the lock is released by the first transaction; and
adding the second request to a queue for the lock.

3. The method of claim 1, wherein the determining comprises determining whether the first transaction was committed to the database and the data was modified, or that the first transaction was rolled back and the data was not modified.

4. The method of claim 1, wherein the providing comprises providing to the second transaction the lock and a flag indicating whether or not the first transaction modified the data while locked.

5. The method of claim 1, wherein if the first transaction modified the data and the second transaction is retried before refreshing the snapshot, the retry results in a serialization error.

6. The method of claim 1, wherein if the first transaction modified the data, the second transaction is aborted without refreshing the snapshot and without retrying the second transaction if the snapshot isolation level comprises a transaction level snapshot that is used without refresh throughout the second transaction.

7. The method of claim 6, wherein if the first transaction modified the data, the snapshot of the data is refreshed before the second transaction is retried if the snapshot isolation level comprises a statement level snapshot that is updated after the execution of each of the statements of the second transaction.

8. The method of claim 1, further comprising:
determining a first timestamp corresponding to the data of the database;
determining a second timestamp corresponding to a snapshot associated with the second transaction; and
setting the flag, prior to releasing the lock, if the first timestamp is subsequent to the second timestamp.

9. The method of claim 1, further comprising:
executing the second transaction based on the refreshed snapshot, wherein the executing was not performed on the snapshot prior to the refreshing based on the determination that the flag was set.

10. The method of claim 1, further comprising:
comparing, after the release of the lock, the data values of a snapshot associated with the second transaction to at least a portion of the data that was modified by the processing of the first transaction.

11. A system, comprising:
a memory; and
at least one processor coupled to the memory and configured to:
receive a release of a lock on data of a database, wherein the lock on the data was provided to a first transaction responsive to a first request to access the data, wherein one or more queued transactions are waiting in a lock queue to access the data;
associate, prior to the lock, a snapshot of the data with a second transaction;
determine whether the data was modified by processing of the first transaction associated with the first request based on whether a flag was set prior to the receiving the release of the lock;
provide the lock to the second transaction, from the lock queue, associated with a second request to access the data;
determine that the flag was set prior to receiving the release of the lock; and refresh the snapshot of the data associated with the second transaction prior to an execution of the second transaction and based on a snapshot isolation level.

12. The system of claim 11, the at least one processor further configured to:
receive the first request to access the data;
provide the lock to the first transaction responsive to receiving the first request; and
receive the second request to access the data before the lock is released by the first transaction; and
add the second request to a queue for the lock.

13. The system of claim 11, wherein the processor is configured to determine by determining whether the first transaction was committed to the database and the data was modified, or that the first transaction was rolled back and the data was not modified.

14. The system of claim 11, wherein the processor is configured to provide by providing the lock and a flag to the second transaction, wherein the flag indicates whether or not the first transaction modified the data.

15. The system of claim 11, wherein if the first transaction modified the data and the second transaction is retried before refreshing the snapshot, the retry results in a serialization error.

16. The system of claim 11, wherein if the first transaction modified the data, the second transaction is aborted without refreshing the snapshot and without retrying the second transaction if the snapshot isolation level comprises a transaction level snapshot used without refresh throughout the second transaction.

17. The system of claim 16, wherein if the first transaction modified the data, the snapshot of the data is refreshed before the second transaction is retried if the snapshot isolation level comprises a statement level snapshot that is updated after the execution of statements of the second transaction.

18. The system of claim 11, wherein the database is partitioned and the data is stored across a plurality of database servers.

19. A non-transitory computer-readable device having instructions stored thereon that, when executed by at least one computing device, causes the at least one computing device to perform operations comprising:
receiving a release of a lock on data of a database, wherein the lock on the data was provided to a first transaction responsive to a first request to access the data, wherein one or more queued transactions are waiting in a lock queue to access the data;
associating, prior to the lock, a snapshot of the data with a second transaction;
determining whether the data was modified by processing of the first transaction associated with the first request based on whether a flag was set prior to the receiving the release of the lock;
providing the lock to the second transaction, from the lock queue, associated with a second request to access the data;
determining that the flag was set prior to receiving the release of the lock; and
refreshing the snapshot of the data associated with the second transaction prior to an execution of the second transaction and based on a snapshot isolation level.

20. The device of claim 19, wherein the data was modified by the first transaction before the release of the lock, and wherein the determination whether the data was modified is performed after the release of the lock.

* * * * *